United States Patent [19]
Edatsune

[11] Patent Number: 5,802,488
[45] Date of Patent: Sep. 1, 1998

[54] INTERACTIVE SPEECH RECOGNITION WITH VARYING RESPONSES FOR TIME OF DAY AND ENVIRONMENTAL CONDITIONS

[75] Inventor: Isao Edatsune, Suwa, Japan

[73] Assignee: Seiko Epson Corporation, Tokyo, Japan

[21] Appl. No.: 609,336

[22] Filed: Feb. 29, 1996

[30] Foreign Application Priority Data

Mar. 1, 1995 [JP] Japan ................................. 7-042005
Dec. 18, 1995 [JP] Japan ................................. 7-329352

[51] Int. Cl.⁶ .............................. G10L 5/06; G10L 5/02
[52] U.S. Cl. ......................... 704/231; 704/258; 704/270; 704/272; 704/232
[58] Field of Search ..................... 395/2.4, 2.41, 395/2.45–2.49, 2.5, 2.6, 2.67, 2.79, 2.81, 2.83; 704/231, 232, 236–239, 240, 241, 251, 258, 270, 272, 275, 274, 257

[56] References Cited

U.S. PATENT DOCUMENTS

| | | | |
|---|---|---|---|
| 4,459,674 | 7/1984 | Sakurai | 395/2.72 |
| 4,923,428 | 5/1990 | Curran | 446/175 |
| 5,029,214 | 7/1991 | Hollander | 704/272 |
| 5,255,342 | 10/1993 | Nitta | 395/2.09 |
| 5,375,173 | 12/1994 | Sanada et al. | 395/2.52 |
| 5,404,422 | 4/1995 | Skamoto et al. | 395/2.41 |
| 5,410,635 | 4/1995 | Sakoe | 395/2.41 |
| 5,481,644 | 1/1996 | Inazumi | 395/2.41 |
| 5,596,679 | 1/1997 | Wang | 395/2.45 |
| 5,638,486 | 6/1997 | Wang et al. | 395/2.45 |
| 5,655,057 | 8/1997 | Takagi | 395/2.42 |

FOREIGN PATENT DOCUMENTS

| | | | |
|---|---|---|---|
| 6-142342 | 5/1994 | Japan | |
| WO 87/06487 | 11/1987 | WIPO | A63H 3/33 |
| WO 93/06575 | 4/1993 | WIPO | G08B 23/00 |

*Primary Examiner*—David D. Knepper
*Attorney, Agent, or Firm*—Mark P. Watson

[57] ABSTRACT

The invention improves recognition rates by providing an interactive speech recognition device that performs recognition by taking situational and environmental changes into consideration, thus enabling interactions that correspond to situational and environmental changes. The invention comprises a speech analysis unit that creates a speech data pattern corresponding to the input speech; a timing circuit for generating time data, for example, as variable data; a coefficient setting unit receiving the time data from the timing circuit and generating weighting coefficients that change over time, in correspondence to the content of each recognition target speech; a speech recognition unit that receives the speech data pattern of the input speech from the speech analysis unit, and that at the same time obtains a weighting coefficient in effect for a pre-registered recognition target speech at the time from the coefficient setting unit, that computes final recognition data by multiplying the recognition data corresponding to each recognition target speech by its corresponding weighting coefficient, and that recognizes the input speech based on the computed final recognition result; a speech synthesis unit for outputting speech synthesis data based on the recognition data that takes the weighting coefficient into consideration; and a drive control unit for transmitting the output from the speech synthesis unit to the outside.

12 Claims, 7 Drawing Sheets

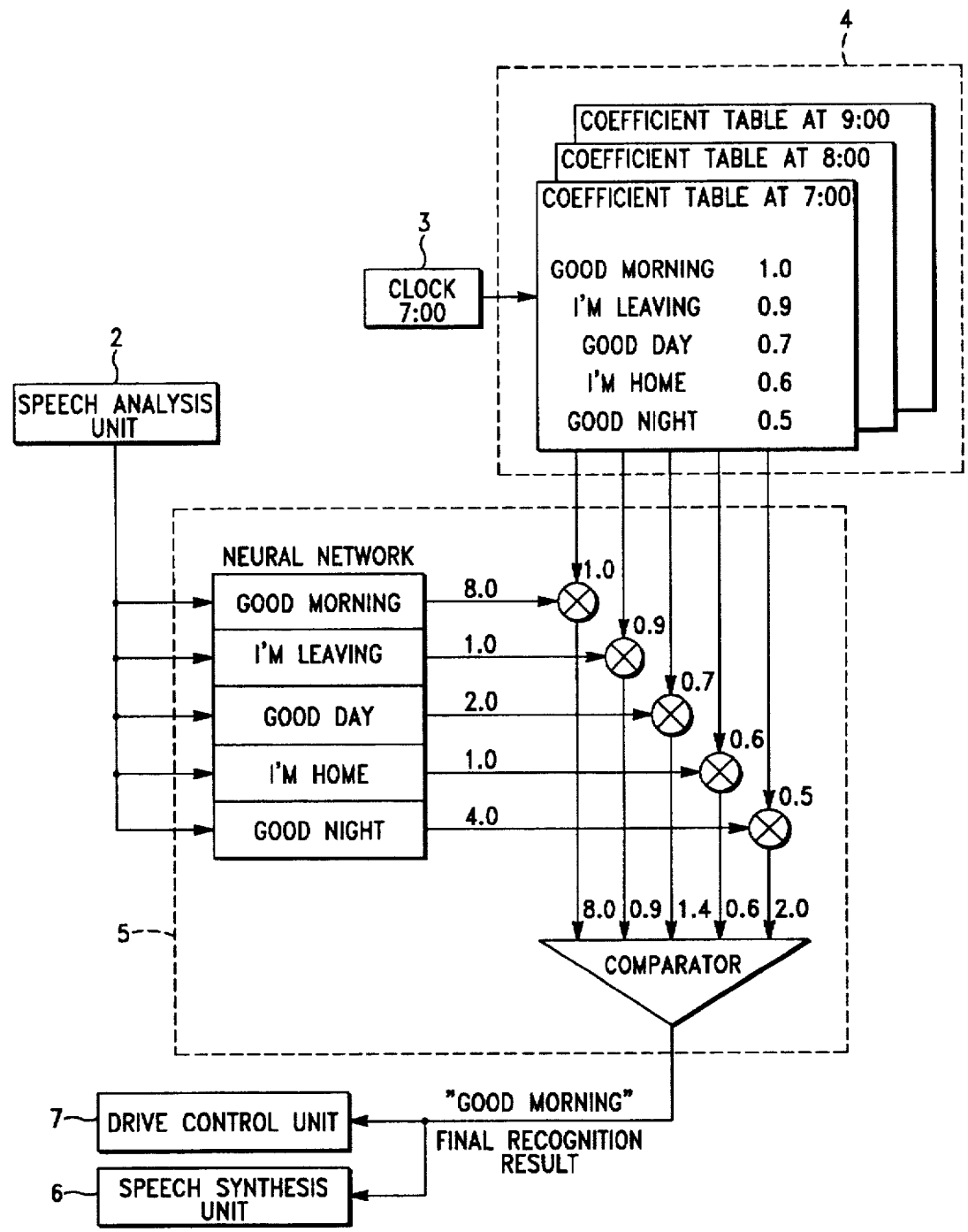
FIG.—1B

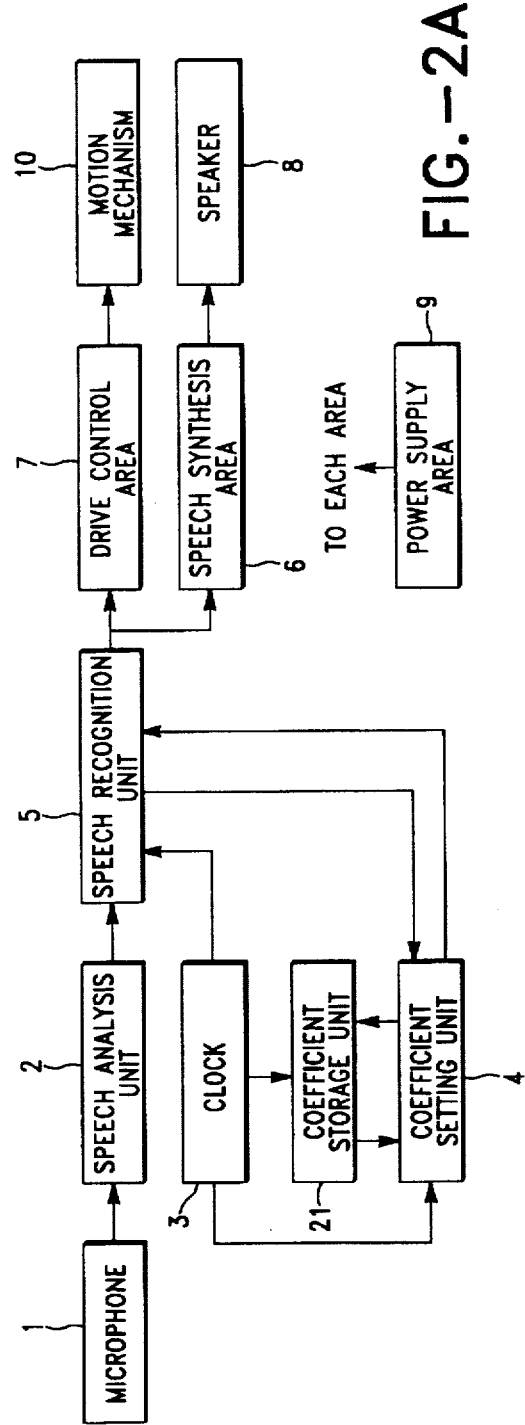
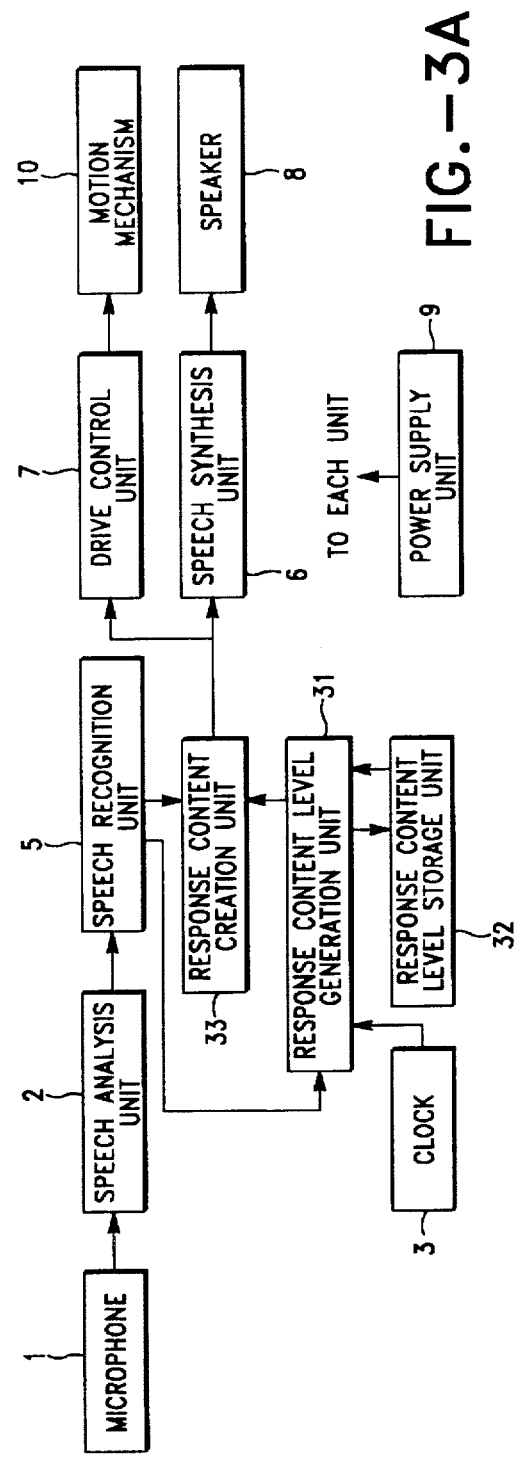
FIG.-2A
FIG.-3A

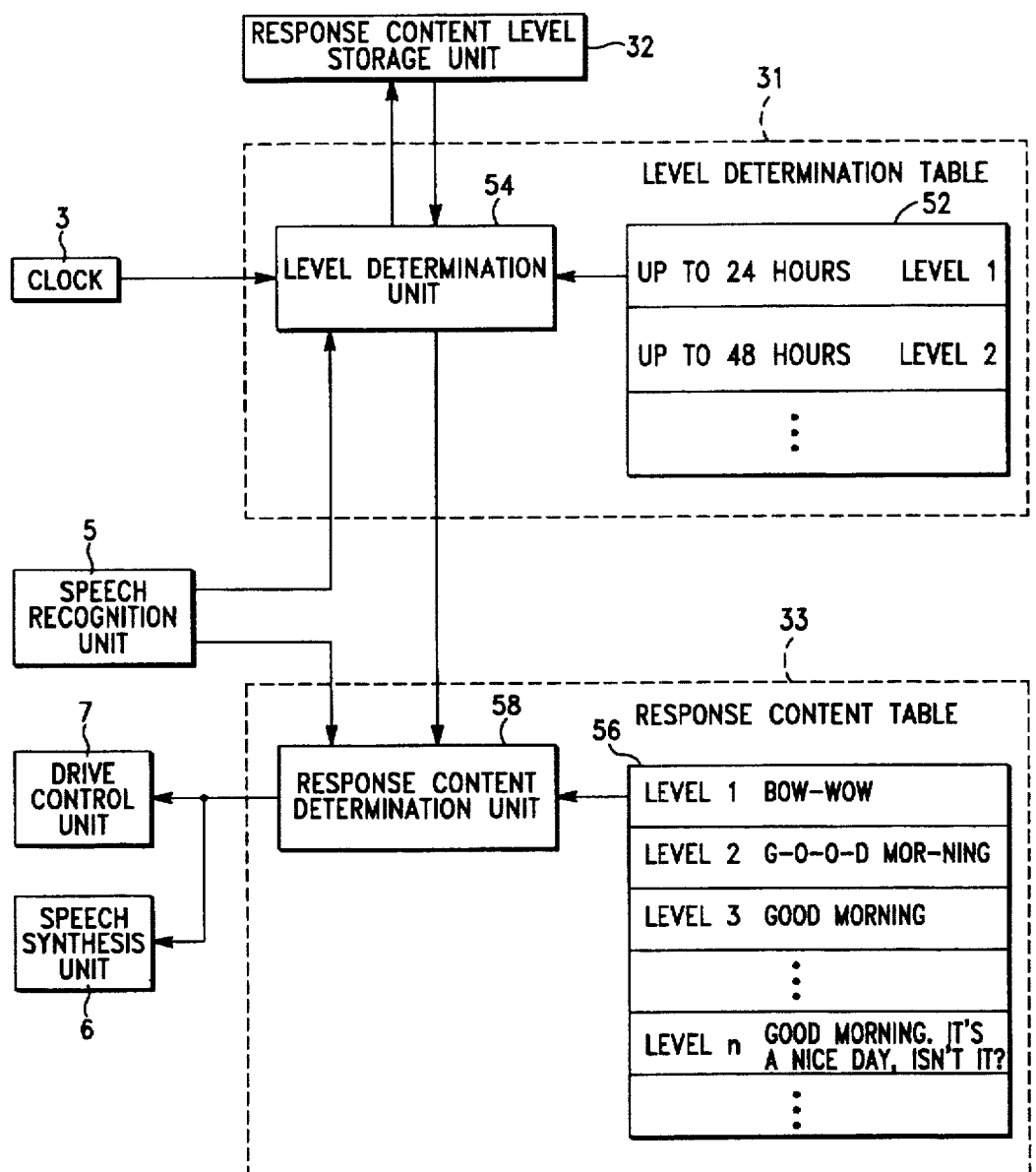
FIG.−3B

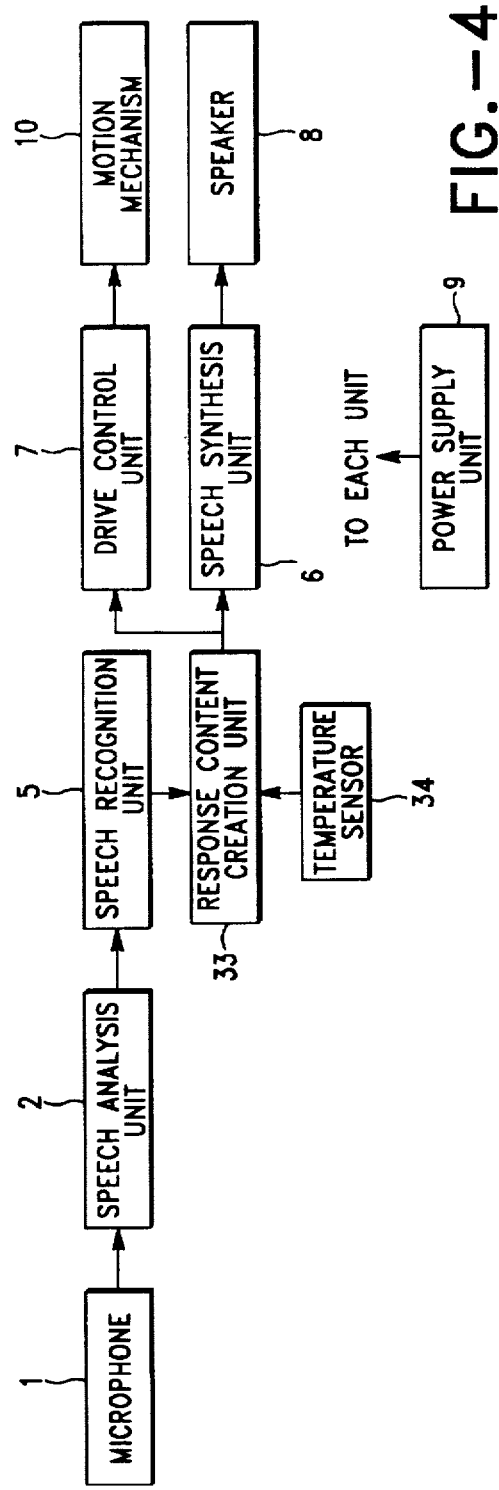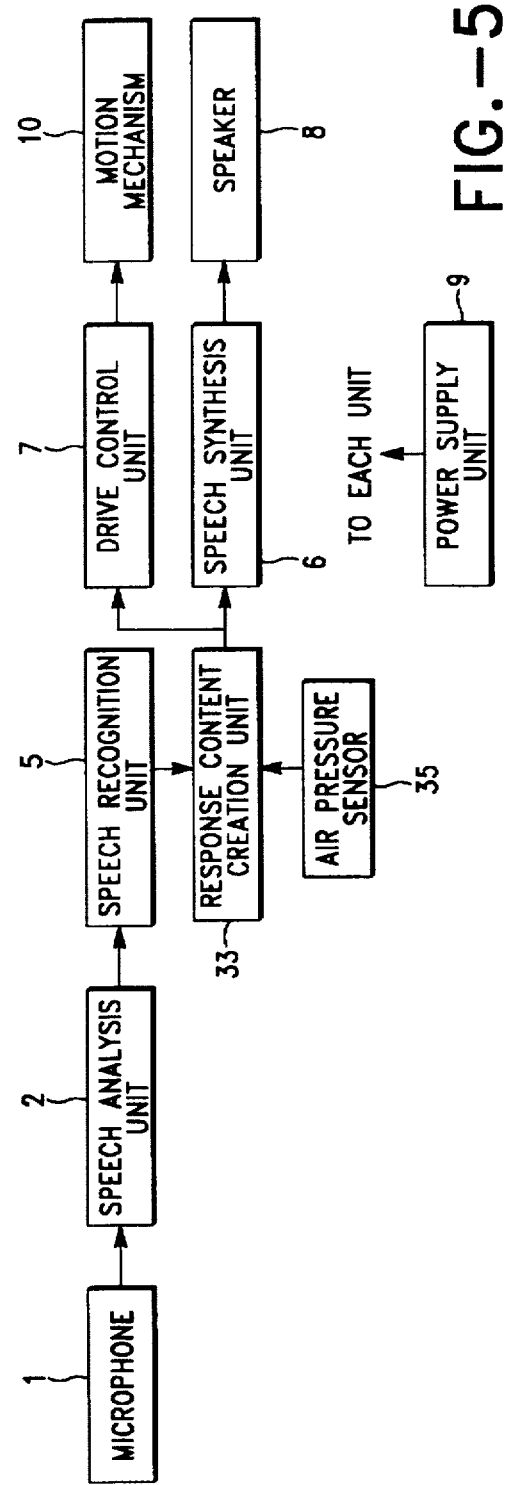

INTERACTIVE SPEECH RECOGNITION WITH VARYING RESPONSES FOR TIME OF DAY AND ENVIRONMENTAL CONDITIONS

BACKGROUND OF THE INVENTION

1. Field of the Invention

This invention relates generally to an interactive speech recognition device that recognizes speech and produces sounds or actions in response to the recognition result.

2. Description of the Related Art

One example of this kind of interactive speech recognition device is a speech recognition toy. For example, in the speech recognition toy disclosed in Japanese patent application Laid-Open No. 6-142342, multiple instructions that will be used as speech instructions are pre-registered as recognition-target phrases. The speech signal issued by a child who is using the toy is compared to the speech signals that have been registered. When there is a match, the electrical signal pre-specified for the speech instruction is output and causes the toy to perform a specified action.

However, in this type of conventional toys such as stuffed toy animals that issue phrases or perform specified actions based on the speech recognition result, the recognition result is often different from the actual word or phrase issued by the speaker; and even when the recognition result is correct, the toys usually cannot respond or return phrases that accommodate changes in the prevailing condition or environment.

Nowadays, sophisticated actions are required even of toys. For example, a child will quickly tire of a stuffed toy animal if it responds with "Good morning" when a child says "Good morning" to it regardless of the time of day. Furthermore, because this type of interactive speech recognition technology possesses the potential of being applied to game machines for older children, or even to consumer appliances and instruments, development of more advanced technologies have been desired.

Therefore, an object of the invention is to provide an interactive speech recognition device that possesses a function for detecting changes in circumstance or environment, e.g., time of day, that can respond to the speech issued by the user by taking into account the change in circumstance or environment, and that enables more sophisticated interactions.

SUMMARY OF THE INVENTION

The interactive speech recognition device of the invention recognizes input speech by analyzing and comparing it to pre-registered speech patterns and responds to the recognized speech. The speech recognition device comprises a speech analysis unit for analyzing an input speech and creating a speech data pattern that matches characteristics of the input speech; a detection unit for detecting variable data that affects the interaction content between the speech recognition device and a speaker; a coefficient setting unit responsive to the variable for generating a plurality of weighting coefficients each pre-assigned to a pre-registered recognition target speech, based on the variable data; a speech recognition unit for computing a final recognition result in response to the speech data pattern, the speech recognition unit including means for storing a plurality of pre-registered recognition target speeches and for outputting, in response to the speech data pattern, a plurality of recognition data values each for a corresponding pre-registered recognition target speech, means for computing final recognition data by multiplying each recognition data value by a corresponding pre-assigned weighting coefficient for a corresponding pre-registered recognition target speech, and means for recognizing the input speech by comparing the final recognition data for all of the pre-registered recognition target speeches and for outputting a final recognition result; and a speech synthesis unit for converting the final recognition result to corresponding synthesized speech data for producing an appropriate response to the input speech.

The variable data detection unit is, for example, a timing circuit for detecting time data, and the coefficient setting unit generates a weighting coefficient that corresponds to the time data of a day for each of the pre-registered recognition target speeches. In this case, the coefficient setting unit can be configured to output a preset largest weighting coefficient for the recognized data if it occurs at a peak time when it was correctly recognized most frequently in the past, and a smaller weighting coefficient as the time deviates from this peak time.

Another embodiment of the interactive speech recognition device of the invention recognizes input speech by analyzing and comparing it to pre-registered speech patterns and responds to the recognized speech. The speech recognition device comprises a speech analysis unit for analyzing an input speech and creating a speech data pattern that matches the characteristics of the input speech; a speech recognition unit for generating recognition data that corresponds to the input speech based on the speech data pattern output by the speech analysis unit; a timing circuit for generating time data; a response content level storage unit for storing information relating to passage of time relative to a response content level; a response content level generation unit for storing time ranges for a plurality of response content levels, the response content level generation means being responsive to the time data from the timing means, the recognition data from the speech recognition means and the information from the response content level storage means, for generating a response content level value according to passage of time; a response content creation unit responsive to the recognition data from the speech recognition means and the response content level value from the response content level generation means for determining response content data appropriate for the response content level value generated by the response content level generation unit; and a speech synthesis unit for converting the response content data from the response content creation unit to corresponding speech synthesis data for producing an appropriate response to the input speech.

Still another embodiment of the interactive speech recognition device of the invention recognizes input speech by analyzing and comparing it to pre-registered speech patterns and responds to the recognized speech. The speech recognition device comprises a speech analysis unit for analyzing an input speech and creating a speech data pattern that matches characteristics of the input speech; a speech recognition unit for generating the recognition data that corresponds to the input speech, based on the speech data pattern from the speech analysis unit; a detection unit for detecting variable data that affects the interaction content between the speech recognition device and a speaker; a response content creation unit, responsive to the variable data from the detection unit and the recognition data from the speech recognition unit, for outputting response content data, based on the recognition data by taking the variable data into consideration; and a speech synthesis unit for converting the response content data to corresponding speech synthesis data for producing an appropriate response to the input speech.

The detection unit may be a temperature sensor that measures an environmental temperature and outputs temperature data, and the response content creation unit outputs the response content data by taking the temperature data into consideration.

Alternatively, the detection means may be an air pressure sensor that measures an environmental air pressure and outputs air pressure data, and the response content creation unit outputs the response content data by taking the air pressure data into consideration.

Alternatively, the detection means may be a calendar detection means that detects calendar data and outputs the calendar data, and the response content creation means outputs the response content data by taking the calendar data into consideration.

According to the invention, in operation a weighting coefficient is assigned to the recognition data of each of the pre-registered recognition target speeches, based on the changes in the variable data (e.g., time of day, temperature, weather, and date) that affects the content of the interaction. If time of day is used as the variable data, for example, a weighting coefficient can be assigned to each recognition data of recognition target speeches according to the time of day, and speech recognition that considers the weighting coefficients can be operated by taking into consideration whether or not the phrase (in particular, a greeting phrase) issued by the speaker is appropriate for the time of day. Therefore, even if the speech analysis result shows that multiple recognition target speeches exist that possess a similar speech pattern, weighting coefficients can increase the differences among the numerical values of the recognition data that are ultimately output, thus improving the recognition rate. The same is also true for other various types of variable data mentioned above, in addition to time of day. For example, if weighting coefficients that correspond to the current temperature are set up, whether or not the greeting phrase issued by the speaker is appropriate relative to the current temperature can be determined. Here again, even if the speech analysis result shows that multiple recognition target speeches exist that possess a similar speech pattern, weighting coefficients can increase the differences among the numerical values of the recognition data that are ultimately output, thus improving the recognition rate.

Furthermore, when time of day is used as the variable data, the relationship between phrases and times of day that matches actual usage can be obtained by detecting the time of day at which a particular phrase is used most often and assigning a large weighting coefficient to this peak time, and smaller weighting coefficients to times of day that deviate farther from this peak time.

Additionally, the response content level can be changed in response to the speaker's phrase by generating the response content level for changing the response content for the input speech as time passes, and by issuing an appropriate response by determining the response content that matches the response level based on the recognition data from the speech recognition unit.

Furthermore, by using data from instruments such as a temperature sensor or air pressure sensor, or variable data such as calendar data, and creating the response content based on these data, the response content can be varied widely, enabling more meaningful interactions.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts

FIG. 1B is a more detailed diagram of the configuration in FIG. 1A;

FIG. 2A is a block diagram showing the overall configuration of Working example 2 of the invention.

FIG. 3A is a block diagram showing the overall configuration of Working example 3 of the invention; FIG. 3B is a more detailed diagram of the configuration in FIG. 3A;

FIG. 4 is a block diagram showing the overall configuration of Working example 4 of the invention;

FIG. 5 is a block diagram showing the overall configuration of Working example 5 of the invention.

DESCRIPTION OF THE PREFERRED EMBODIMENTS

The invention is explained in detail below using working examples. Note that the invention has been applied to a toy in these working examples, and more particularly to a stuffed toy dog intended for small children.

Working example 1

Figure 1A:
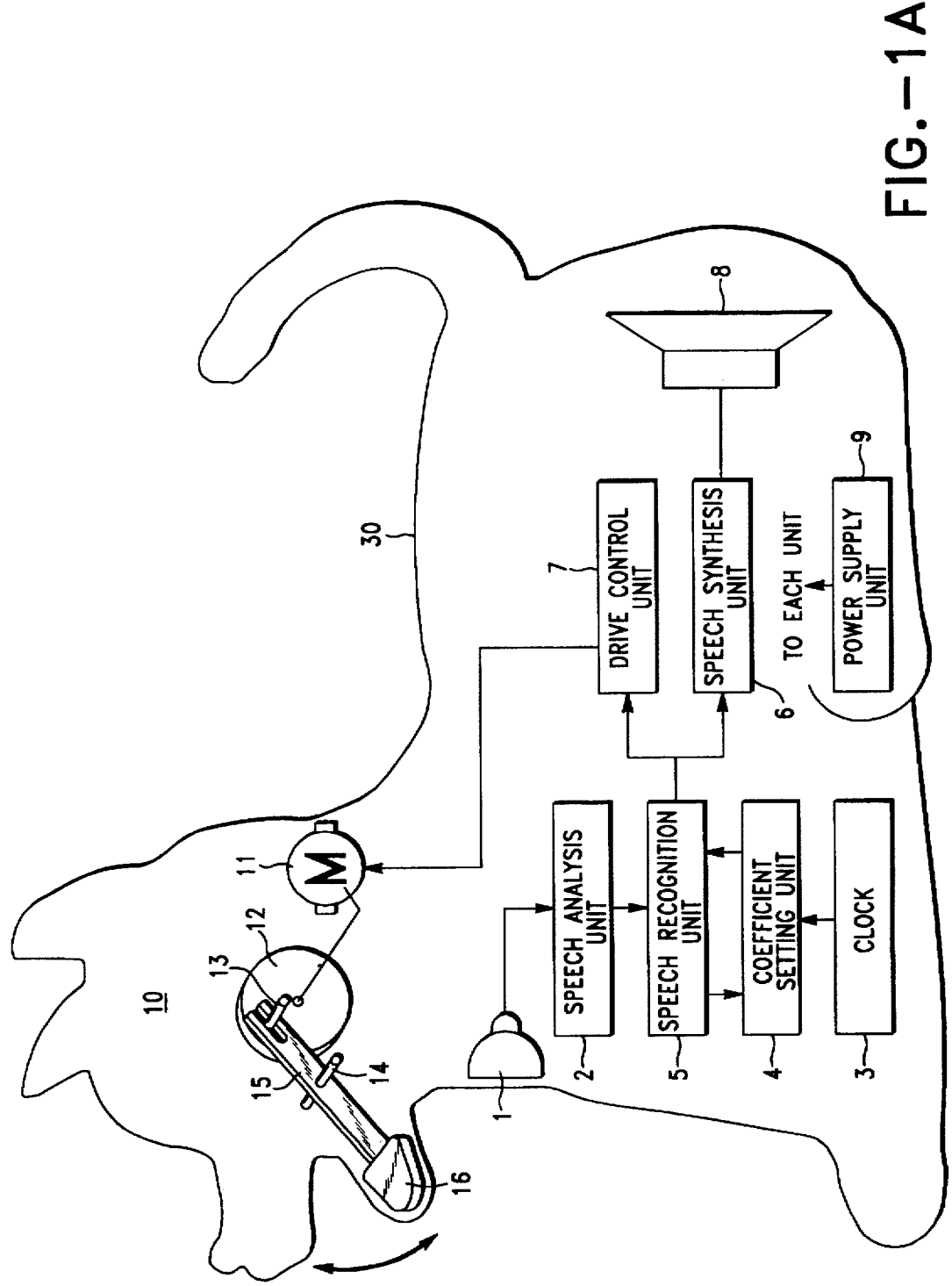
FIG. 1A is a block diagram showing the overall configuration of the stuffed toy dog of Working example 1 of the invention.

In Working example 1, weighting coefficients are set up for the recognition data of pre-registered recognition target speeches according to the value of the variable data (e.g., time of day, temperature, weather, and date) that affects the interaction content, in order to improve the recognition rate when a greeting phrase is input. FIG. 1A is a block diagram that illustrates Working example 1 of the invention. The embodiment will be briefly explained first, and the individual functions will be explained in detail later. Note that Working example 1 uses time of day as the variable data that affects the content of the interaction.

In FIG. 1A, in the stuffed toy dog 30, microphone 1 inputs speeches from outside. Speech analysis unit 2 analyzes the speech input from microphone 1 and generates a speech pattern that matches the characteristics volume of the input speech. Clock 3 is a timing means for outputting timing data such as the time at which the speech is input, and the time at which this speech input is recognized by the speech recognition unit described below. Coefficient setting unit 4 receives the time data from clock 3 and generates weighting coefficients that change over time, in correspondence to the content of each recognition target speech. Speech recognition unit 5 receives the speech data pattern of the input speech from speech analysis unit 2 and at the same time obtains a weighting coefficient in effect for a registered recognition target speech at the time from coefficient setting unit 4. As will be described below, in connection with FIG. 1B, speech recognition unit 5 computes the final recognition data by multiplying the recognition data corresponding to each recognition target speech by its corresponding weighting coefficient, recognizes the input speech based on the computed final recognition data, and outputs the final recognition result of the recognized speech. Speech synthesis unit 6 outputs the speech synthesis data that corresponds to the final recognition result recognized by taking the coefficient from speech recognition unit 5 into consideration. Drive control unit 7 drives motion mechanism 10 which moves the mouth, etc. of stuffed toy 30 according to the drive condition that are predetermined in correspondence to the recognition data recognized by speech recognition unit 5. Speaker 8 outputs the content of the speech synthesized by speech synthesis unit 6 to the outside. Power supply unit 9 drives all of the above units.

Speech recognition unit 5 in the example uses a neural network, as shown in FIG. 1B, that handles a non-specific speaker, as its recognition means. However, the recognition means is not limited to the method that handles a non-specific speaker, and other known methods such as a method that handles a specific speaker, DP matching, and HMM, can be used as the recognition means.

In motion mechanism 10, motor 11 rotates based on the drive signal (which matches the length of the output signal from speech synthesis unit 6) output by drive control unit 7. When cam 12 rotates in conjunction with motor 11, protrusion-shaped rib 13 provided on cam 12 moves in a circular trace in conjunction with the rotation of cam 12. Crank 15 which uses axis 14 as a fulcrum is clipped on rib 13, and moves lower jaw 16 of the stuffed toy dog up and down synchronously with the rotation of cam 12.

In this embodiment, the speech input from microphone 1 is analyzed by speech analysis unit 2, and a speech data pattern matching the characteristics volume of the input speech is created. This speech data pattern is input into the input unit of the neural network provided in speech recognition unit 5, and is recognized as explained below.

With reference to FIGS. 1A and 1B, the explanation below is based on an example in which several greeting words or phrases are recognized. For example, greeting phrases such as "Good morning," "I'm leaving," "Good day," "I'm home," and "Good night" are used here for explanation. Suppose that a phrase "Good morning" issued by a non-specific speaker is input into microphone 1. The characteristics of this speaker's "Good morning" are analyzed by speech analysis unit 2 and are input into speech recognition unit 5 as a speech data pattern.

At the same time, the time at which the phrase "Good morning" input from microphone 1 is detected as sound pressure, or the data related to the time at which the phrase "Good morning" is recognized by the neural network of speech recognition unit 5 is supplied from clock 3 to coefficient setting unit 4. Note that the time to be referenced by coefficient setting unit 4 is the time the speech is recognized by speech recognition unit 5 in this case.

The speech data pattern of "Good morning" that is input into the neural network of speech recognition unit 5 in this way is output from the output unit of the neural network as a recognition data possessing a value, instead of a binary data, as shown in FIG. 1B. Here, an example in which this value is a number between 0 and 10 possessing a floating point is used for explanation.

As shown in FIG. 1B, when the speaker says "Good morning" to stuffed toy 30, the neural network of speech recognition unit 5 outputs a recognition data value of 8.0 for "Good morning," 1.0 for "I'm leaving," 2.0 for "Good day," 1.0 for "I'm home," and 4.0 for "Good night." The fact that the recognition data from the neural network for the speaker's "Good morning" is a high value of 8.0 is understandable. The reason why the recognition data value for "Good night" is relatively high compared to those for "I'm leaving," "Good day, " and "I'm home" is presumed to be because the speech pattern data of "Good morning" and "Good night" of a non-specific speaker, analyzed by speech analysis unit 2, are somewhat similar to each other. Therefore, although the probability is nearly nonexistent that the speaker's "Good morning" will be recognized as "I'm leaving, " "Good day, " or "I'm home," the probability is high that the speaker's "Good morning" will be recognized as "Good night."

During this process, speech recognition unit 5 fetches the weighting coefficient pre-assigned to a recognition target speech by referencing coefficient setting unit 4, and multiply the recognition data by this coefficient. Because different greeting phrases are used depending on the time of day, weighting coefficients are assigned to various greeting phrases based on the time of day. For example, if the current time is 7:00 am, 1.0 will be used as the weighting coefficient for "Good morning," 0.9 for "I'm leaving, " 0.7 for "Good day, " 0.6 for "I'm home," and 0.5 for "Good night." These relationships among recognition target speeches, time of day, and coefficients are stored in coefficient setting unit 4 in advance.

When weighting coefficients are used in this way, the final recognition data of "Good morning" will be 8.0 (i.e., 8.0× 1.0) since the recognition data for "Good morning" output by the neural network is 8.0 and the coefficient for "Good morning" at 7:00 am is 1.0. Likewise, the final recognition data for "I'm leaving" will be 0.9 (i.e., 1.0×0.9), the final recognition data for "Good day" will be 1.4 (i.e., 2.0×0.7), the final recognition data for "I'm home" will be 0.6 (i.e., 1.0×0.6), and the final recognition data for "Good night" will be 2.0 (i.e., 4.0×0.5). In this way, speech recognition unit 5 creates final recognition data by taking time-dependent weighting coefficients into consideration.

When the final recognition data are determined by taking time-dependent weighting coefficients into consideration in this way, the final recognition data for "Good morning" is four times larger than that for "Good night." As a result, speech recognition unit 5 can accurately recognize the phrase "Good morning" when it is issued by the speaker. Note that the number of phrases that can be recognized can be set to any value.

As shown in FIG. 1B, the final recognition result of the phrase "Good morning" determined in this way is input into speech synthesis unit 6 and drive control unit 7. Speech synthesis unit 6 converts the final recognition result from speech recognition unit 5 to pre-determined speech synthesis data, and outputs that speech synthesis output from speaker 8. For example, "Good morning" will be output from speaker 8 in response to the final recognition result of the phrase "Good morning" in this case. That is, when the child playing with the stuffed toy says "Good morning" to the toy, the toy responds with "Good morning." This is because the phrase issued and the time of day match each other since the child says "Good morning" at 7:00 am. As a result "Good morning" is correctly recognized and an appropriate response is returned.

At the same time, drive control unit 7 drives individual action mechanisms according to the drive conditions predetermined for the final recognition result. Here, the mouth of stuffed toy dog 30 is moved synchronously with the output signal ("Good morning" in this case) from speech synthesis unit 6. Naturally, in addition to moving the mouth of the stuffed toy, it is possible to move any other units, such as shaking the head or tail, for example.

Next, a case in which the current time is 8:00 pm is explained. In this case, 0.5 is set as the weighting coefficient for "Good morning," 0.6 for "I'm leaving, " 0.7 for "Good day, " 0.9 for "I'm home," and 1.0 for "Good night."

When weighting coefficients are used in this way, the final recognition data of "Good morning" will be 4.0 (i.e., 8.0× 0.5) since the recognition data for "Good morning" output by the neural network is 8.0 and the weighting coefficient for "Good morning" at 8:00 pm is 0.5. Likewise, the final recognition data for "I'm leaving" will be 0.6 (i.e., 1.0×0.6), the final recognition data for "Good day" will be 1.4 (i.e., 2.0×0.7), the final recognition data for "I'm home" will be 0.9 (i.e., 1.0×0.9), and the final recognition data for "Good night" will be 4.0 (i.e., 4.0×1.0).

In this way, speech recognition unit 5 creates final recognition data by taking weighting coefficients into consideration. Since the final recognition data for both "Good morning" and "Good night" are 4.0, the two phrases cannot be differentiated. In other words, when the speaker says "Good morning" at 8:00 pm, it is not possible to determine whether the phrase is "Good morning" or "Good night."

This final recognition result is supplied to speech synthesis unit 6 and drive control unit 7, both of which act accordingly. That is, speech synthesis unit 6 converts the final recognition data to a pre-determined ambiguous speech synthesis data and outputs it. For example, "Something is funny here!" is output from speaker 8, indicating that "Good morning" is not appropriate for use at night time.

At the same time, drive control unit 7 drives individual action mechanisms according to the drive conditions predetermined for the final recognition data. Here, the mouth of stuffed toy dog is moved synchronously with the output signal ("Something is funny here!" in this case) from speech synthesis unit 6. Naturally, in addition to moving the mouth of the stuffed toy, it is possible to move any other units, as in the case above.

Next, a case in which the speaker says "Good night" when the current time is 8:00 pm is explained. In this case, it is assumed that the neural network of speech recognition unit 5 outputs a recognition data value of 4.0 for "Good morning," 1.0 for "I'm leaving, " 2.0 for "Good day, " 1.0 for "I'm home," and 8.0 for "Good night." When the current time is 8:00 pm, 0.5 will be used as the weighting coefficient for "Good morning," 0.6 for "I'm leaving, " 0.7 for "Good day, " 0.9 for "I'm home," and 1.0 for "Good night."

When weighting coefficients are used in this way, the final recognition data of "Good morning" will be 2.0 (i.e., 4.0× 0.5) since the recognition data for "Good morning" output by the neural network is 4.0 and the weighting coefficient for "Good morning" at 8:00 pm is 0.5. Likewise, the final recognition data for "I'm leaving" will be 0.9 (i.e., 1.0×0.9), the final recognition data for "Good day" will be 1.4 (i.e., 2.0×0.7), the final recognition data for "I'm home" will be 0.6 (i.e., 1.0×0.6), and the final recognition data for "Good night" will be 8.0 (i.e., 8.0×1.0). In this way, speech recognition unit 5 creates final recognition data by taking weighting coefficients into consideration.

When the final recognition data are determined by taking time-related information into consideration in this way, the final recognition data for "Good night" is four times larger than that for "Good morning." As a result, speech recognition unit 5 can accurately recognize the phrase "Good night" when it is issued by the speaker.

The final recognition data of the phrase "Good night" determined in this way is input into speech synthesis unit 6 and drive control unit 7. Speech synthesis unit 6 converts the final recognition data from speech recognition unit 5 to predetermined speech synthesis data, and outputs that speech synthesis output from speaker 8. For example, "Good night" will be output from speaker 8 in response to the final recognition data of the phrase "Good night" in this case.

Although the response from stuffed toy 30 is "Good morning" or "Good night" in response to the speaker's "Good morning" or "Good night", respectively, in the above explanation, it is possible to set many kinds of phrases as the response. For example, "You're up early today" can be used in response to "Good morning."

Furthermore, although the time of day is used as the variable data for setting weighting coefficients in Working example 1, it is also possible to set weighting coefficients based on other data such as temperature, weather, and date. For example, if temperature is used as the variable data, temperature data is detected from a temperature sensor that measures the air temperature, and weighting coefficients are assigned to the recognition data for weather-related greeting phrases (e.g., "It's hot, isn't it?" or "It's cold, isn't it?") that are input and to other registered recognition data. In this way, the difference in the values of the two recognition data is magnified by their weighting coefficients even if a speech data pattern that is similar to the input speech exists, thus increasing the recognition rate. Furthermore, if a combination of variable data such as time of day, temperature, weather, and date, is used and weighting coefficients are assigned to these variable data, the recognition rate for various greeting phrases can be increased even further.

Working example 2

Figure 2B:
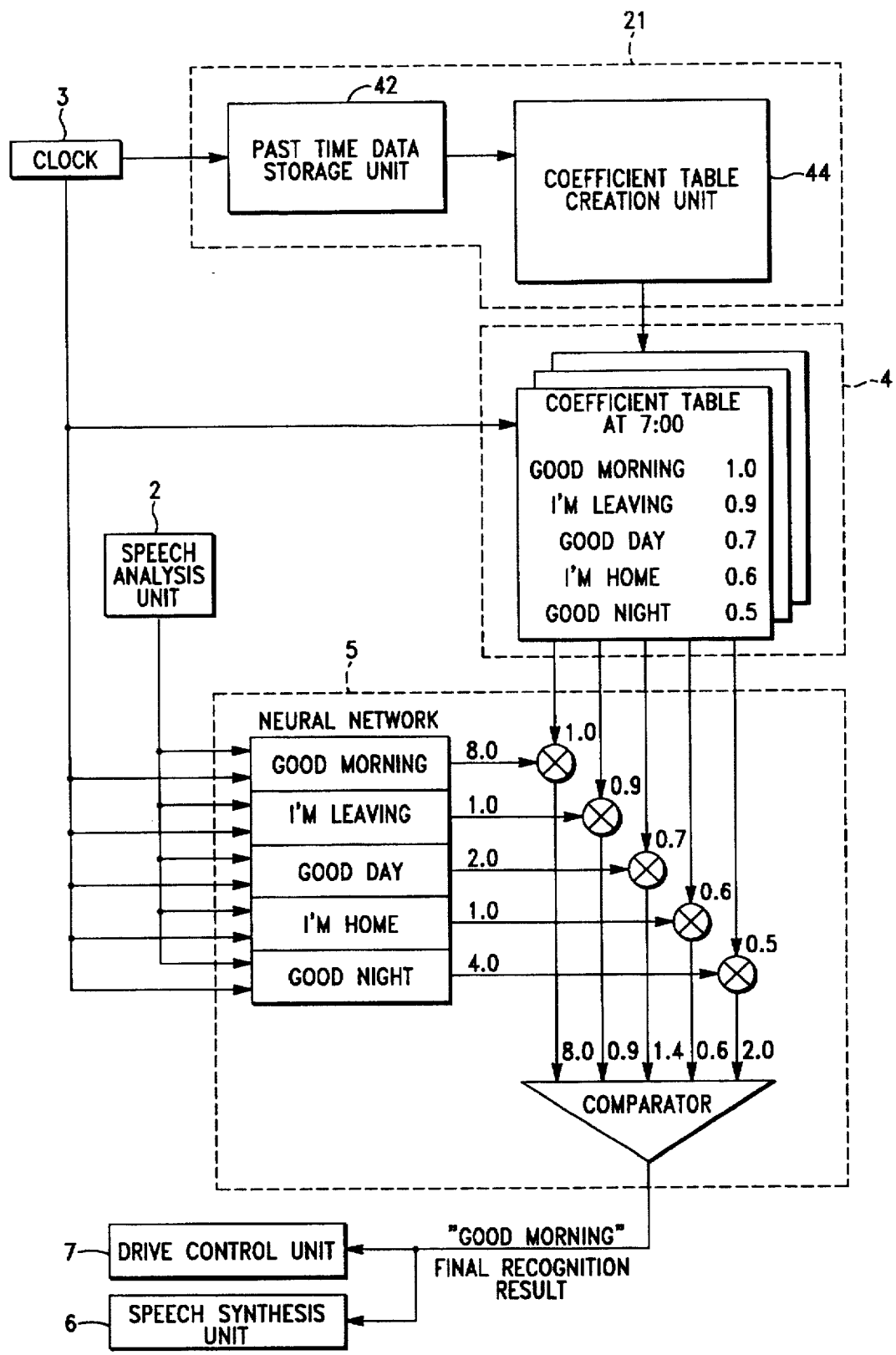
FIG. 2B is a more detailed diagram of the configuration in FIG. 1A.

Next, Working example 2 of the invention will be explained with reference to FIGS. 2A and 2B. Note that stuffed toy dog 30, motion mechanism 10 for moving the mouth of the stuffed toy, etc. are omitted from FIG. 2A. FIG. 2A is different from FIG. 1A in that coefficient storage unit 21 is provided for storing the weighting coefficients for recognizable phrases that are set by coefficient setting unit 4 according to time data. Since all other elements are identical as in FIG. 1A, like symbols are used to represent like parts. The processing between coefficient storage unit 21 and coefficient setting unit 4 will be explained later.

In FIG. 2A, the speech that is input from microphone 1 is analyzed by speech analysis unit 2, and a speech data pattern matching the characteristics volume of the input speech is created. This speech data pattern is input into the input unit of the neural network provided in speech recognition unit 5, as shown in FIG. 2B, and is recognized as explained below.

With reference to FIGS. 2A and 2B the explanation below is based on an example in which several greeting words or phrases are recognized. For example, greeting phrases such as "Good morning," "I'm leaving, " "Good day, " "I'm home," and "Good night" are used here for explanation. Suppose that a phrase "Good morning" issued by a non-specific speaker is input into microphone 1. The characteristics of this speaker's "Good morning" are analyzed by speech analysis unit 2 and are input into speech recognition unit 5 as a speech data pattern.

At the same time, the time at which the phrase "Good morning" input from microphone 1 is detected as sound pressure, or the data related to the time at which the phrase "Good morning" is recognized by the neural network of speech recognition unit 5 is supplied from clock 3 to coefficient setting unit 4. Note that the time to be referenced by coefficient setting unit 4 is the time the speech is recognized by speech recognition unit 5 in this case.

The speech data pattern of "Good morning" that is input into the neural network of speech recognition unit 5 in this way is output from the output unit of the neural network as a recognition data possessing a value, instead of a binary data. Here, an example in which this value is a number between 0 and 10 possessing a floating point is used for explanation.

As shown in FIG. 2B, when the speaker says "Good morning" to stuffed toy 30, the neural network of speech recognition unit 5 outputs a recognition data value of 8.0 for "Good morning," 1.0 for "I'm leaving, " 2.0 for "Good day, " 1.0 for "I'm home," and 4.0 for "Good night." The fact that the recognition data from the neural network for the speaker's "Good morning" is a high value of 8.0 is understandable. The reason why the recognition data value for "Good night" is relatively high compared to those for "I'm leaving," " "Good day," and "I'm home" is presumed to be because the speech pattern data of "Good morning" and "Good night" of a non-specific speaker, analyzed by speech analysis unit 2, are somewhat similar to each other. Therefore, although the probability is nearly nonexistent that the speaker's "Good morning" will be recognized as "I'm leaving," "Good day," or "I'm home," the probability is high that the speaker's "Good morning" will be recognized as "Good night." Up to this point, Working example 2 is nearly identical to Working example 1.

Speech recognition unit 5 fetches the weighting coefficient assigned to a recognition target speech according to time data by referencing coefficient setting unit 4. However, in Working example 2, coefficient storage unit 21 is connected to coefficient setting unit 4, and the content (weighting coefficients) stored in coefficient storage unit 21 is referenced by coefficient setting unit 4. As shown in FIG. 2B, coefficient storage unit 21 includes past time data storage unit 42 that stores the time data relating to past statistic data and coefficient table creation unit 44 that creates coefficient tables based on the statistic data from past time data storage unit 42. Based on coefficient tables created by coefficient table creation unit 42, coefficient setting unit 4 outputs a large weighting coefficient for multiplying to the recognition data of a phrase if the phrase occurs at the time of day it was most frequently recognized, and outputs a smaller weighting coefficient for multiplying to the recognition data of the phrase as the phrase occurs away from that time of day. In other words, the largest weighting coefficient is assigned to the recognition data when the phrase occurs at the time of day with the highest usage frequency, and a smaller weighting coefficient is assigned to the recognition data as the phrase occurs away from that time of day.

For example, as shown in FIG. 2B if it is assumed that the current time is 7:00 am, and that 1.0 is used as the initial weighting coefficient for "Good morning," 0.9 for "I'm leaving," 0.7 for "Good day," 0.6 for "I'm home," and 0.5 for "Good night," and these coefficients are stored in coefficient storage unit 21, the final recognition data of "Good morning" will be 8.0 (i.e., 8.0×1.0) since the recognition data for "Good morning" output by the neural network is 8.0 and the coefficient for "Good morning" fetched from memory unit 21 at 7:00 am is 1.0. Likewise, the final recognition data will be 0.9 for "I'm leaving," 1.4 for "Good day," 0.6 for "I'm home," and 2.0 for "Good night." These final recognition data are initially created by speech recognition unit 5.

Even when recognition is performed by taking into consideration the weighting coefficient based on the time of day, there is some range of time in which a certain phrase will be correctly recognized. For example, the phrase "Good morning" may be correctly recognized at 7:00 am, 7:30 am, or 8:00 am. By taking this factor into consideration, coefficient table creation unit 44 of coefficient storage unit 21 stores the largest weighting coefficient for a phrase when it occurs at the time of day with the highest usage frequency based on the time data for recognizing that phrase in the past, and stores a smaller weighting coefficient for the phrase as it occurs away from that time of day.

For example, if the phrase "Good morning" was most frequently recognized at 7:00 am according to the past statistics, the coefficient to be applied to the recognition data of "Good morning" is set the largest when the time data indicates 7:00 am, and smaller as the time data deviates farther away from 7:00 am. That is, the coefficient is set at 1.0 for 7:00 am, 0.9 for 8:00 am, and 0.8 for 9:00 am, for example. The time data used for setting coefficients is statistically created based on several past time data instead of just one time data. Note that the coefficients during the initial setting are set to standard values for pre-determined times of day. That is, in the initial state, the weighting coefficient for "Good morning" at 7:00 am is set to 1.0.

The coefficient of the "Good morning" that is most recently recognized is input into coefficient storage unit 21 as a new coefficient data along with the time data, and coefficient storage 21 updates the coefficient for the phrase based on this data and past data as needed.

By making the coefficient for a phrase the largest at the time of day when it is used most frequently, when the phrase "Good morning" is issued at around 7:00 am, the final recognition data of "Good morning" will be 8.0 (i.e., 8.0× 1.0) since the recognition data for "Good morning" output by the neural network is 8.0 and the coefficient for "Good morning" fetched from memory unit 21 at 7:00 am is 1.0. Since this final recognition data is at least four times larger than those of other phrases, the phrase "Good morning" is correctly recognized by speech recognition unit 5.

The final recognition result of the phrase "Good morning" determined in this way is input into speech synthesis unit 6 and drive control unit 7. Speech synthesis unit 6 converts the final recognition result from speech recognition unit 5 to predetermined speech synthesis data, and a preset phrase such as "Good morning" or "You're up early today" is returned through speaker 8 embedded in the body of the stuffed toy dog, as a response to the speaker's "Good morning."

On the other hand, if "Good morning" is issued at around 12 noon, the coefficient for "Good morning" becomes small, making the final recognition data for "Good morning" small, and "Good morning" will not be recognized. In such a case, speech synthesis unit 6 is programmed to issue a corresponding phrase as in Working example 1, and a response such as "Something is funny here!" is issued by stuffed toy 30.

Working example 3

Next, Working example 3 of the invention will be explained with reference to FIGS. 3A and 3B. Note that stuffed toy dog 30, motion mechanism 10 for moving the mouth of the stuffed toy, etc. shown in FIG. 1 are omitted from FIG. 3A. In working example 3, microphone 1 inputs speeches from outside. Speech analysis unit 2 analyzes the speech input from microphone 1 and generates a speech pattern that matches the characteristics volume of the input speech. Clock 3 outputs timing data. Speech recognition unit 5 outputs the recognition data for the input speech based on the speech data pattern output by speech analysis unit 2. Speech synthesis unit 6 outputs the speech synthesis data that corresponds to the final recognition data recognized by taking the coefficient from speech recognition unit 5 into consideration. Drive control unit 7 drives motion mechanism 10 (see FIG. 1A) which moves the mouth, etc. of stuffed toy 30 according to the drive condition that are predetermined in correspondence to the recognition data recognized by speech recognition unit 5. Speaker 8 outputs the content of the speech synthesized by speech synthesis unit 6 to the outside. Power supply unit 9 drives all of the above units. Response content level generation unit 31, response content level storage unit 32, and response content creation unit 33 are also included in this embodiment.

Speech recognition unit 5 in the example uses a neural network that handles a non-specific speaker, as its recognition means. However, the recognition means is not limited to the method that handles a non-specific speaker, and other known methods such as a method that handles a specific speaker, DP matching, and HMM, can be used as the recognition means.

Response content level generation unit 31 generates response level values for increasing the level of response content as time passes or as the number of recognition's by speech recognition unit 5 increases. As shown in FIG. 3B, response content level generation unit 31 includes level determination table 52 and level determination unit 54. Level determination table 52 contains time ranges for various levels, e.g., level 1 applies up to 24 hours, etc. Level determination unit 54 determines the level value according to the time elapsed. Response content level storage unit 32 stores the relationship between the response level values generated by response content level generation unit 31 and time. That is, the relationship between the passage of time and level value is stored, e.g., level 1 when the activation switch is turned on for the first time after the stuffed toy is purchased, level 2 after 24 hours pass, and level 3 after 24 more hours pass. In other words, response content level storage unit 32 stores information of the time elapsed relative to a level value listed in level determination table 52. For example, storage unit 32 stores information that 2 hours have passed from level 2 in a case where 50 hours have passed from a certain point of time. Thus, storage unit 32 stores information of time elapsed so that the data contained in level determination table 52 corresponds to the information.

As shown in FIG. 3B, response content creation unit 33 includes response content table 56 and response content determination unit 58. When the final recognition data is received from speech recognition unit 5, response content determination unit 58 references response content level generation unit 31 and determines response content that corresponds to the response content level value. During this process, response content level generation unit 31 fetches the response content level that corresponds to the time data from response content level storage unit 32. For example, response content level 1 is fetched if the current time is within the first 24 hours after the switch was turned on for the first time, and level 2 is fetched if the current time is between 24th and 48th hours.

Response content creation unit 33 then creates recognition data with the response content that corresponds to the fetched response content level, based on the recognition data from speech recognition unit 5. For example, "Bow-wow" is returned for recognition data "Good morning" when the response content level (hereafter simply referred to as "level") is 1, broken "G-o-o-d mor-ning" for level 2, "Good morning" for level 3, and "Good morning. It's a nice day, isn't it?" for a higher level n. In this way, both the response content and level are increased as time passes. The response data created by response content creation unit 33 is synthesized into a speech by speech synthesis unit 6 and is output from speaker 8.

Suppose that a phrase "Good morning" issued by a non-specific speaker is input into microphone 1. The characteristics of this speaker's "Good morning" are analyzed by speech analysis unit 2 and are input into speech recognition unit 5 as a speech data pattern.

The speech data pattern of "Good morning" that is input into the neural network of speech recognition unit 5 in this way is output from the output unit of the neural network as a recognition data possessing a value, instead of a binary data. If the recognition data for the phrase "Good morning" is higher than those recognition data for other phrases, speech recognition unit 5 correctly recognizes the speaker's "Good morning" as "Good morning."

The final recognition result for the phrase "Good morning" thus identified is input into response content creation unit 33. Response content determination unit 58 in response content creation unit 33 then determines the response content for the final recognition result, based on the final recognition result and the response level value of response content level generation unit 31.

As explained above, the response level value from response content level generation unit 31 is used for gradually increasing the level of response content in response to the phrase issued by the speaker; and in this case, the level is increased as time passes based on the time data of clock 3. However, it is also possible to change the level value based on the number or types of phrases recognized, instead of the passage of time. Alternatively, it is possible to change the level value based on the combination of the passage of time and the number or types of phrases recognized.

Working example 3 is characterized in that it provides an illusion that the stuffed toy is growing up like a living creature as time passes. In other words, the stuffed toy can only respond with "Bow-wow" to "Good morning" on the first day after being purchased because the response level is only 1. However, on the second day, it can respond with "G-o-o-d mor-ning" to "Good morning" on the second day because the response level is 2. Furthermore, after several days, the stuffed toy can respond with "It's a nice day, isn't it?" to "Good morning" because of a higher level.

Although the clock of time for increasing the response content by one level was set at 1 day (24 hours) in the above explanation, the unit is not limited to 1 day, and it is possible to use a longer or shorter time span for increasing the level. Note that it will be possible to reset level increase if a reset switch for resetting the level is provided. For example, it will be possible to reset the level back to the initial value when level 3 has been reached.

Although the above explanation was provided for the response to the phrase "Good morning," it is not limited to "Good morning" and is naturally applicable to upgrading of responses to other phrases such as "Good night" and "I'm leaving." Take "Good night" for example. The content of the response from the stuffed toy in reply to "Good night" can be changed from "Unn-unn" (puppy cry) in level 1, to "G-o-o-d nigh-t" in level 2.

By increasing the level of response content in this way, the stuffed toy dog can be made to appear to be changing the content of its response as it grows. The toy can then be made to act like a living creature by making it respond differently as time passes even when the same phrase "Good morning" is recognized. Furthermore, the toy is not boring because it responds with different phrases even when the speaker says the same thing.

Working example 3 is also useful for training the speaker to find out the best way to speak to the toy in order to obtain a high recognition rate when the toy's response content level value is still low. That is, when the speaker does not pronounce "Good morning" in a correct way, the "Good morning" will not be easily recognized, often resulting in a low recognition rate. However, if the toy responds with "Bow-wow" to "Good morning," this means that the "Good morning" was correctly recognized. Therefore, if the speaker practices to speak in a recognizable manner early on, the speaker can learn how to speak so that the speech can be recognized. Consequently, the speaker's phrases will be recognized at high rates even when the response content level value gradually increases, resulting in smooth interactions.

Working example 4

Next, Working example 4 of the invention will be explained with reference to FIG. 4. Note that stuffed toy dog 30, motion mechanism 10 for moving the mouth of the stuffed toy, etc. shown in FIG. 1 are omitted from FIG. 4. In Working example 4, temperature is detected as one of the variable data that affect the interaction, and the change in temperature is used for changing the content of the response from response content creation unit 33 shown in Working example 3 above. Temperature sensor 34 is provided in FIG. 4, and like symbols are used to represent like parts as in FIG. 3. When it receives the recognition data from speech recognition unit 5, response content creation unit 33 determines the response content for stuffed toy 30 based on the recognition data and the temperature data from temperature sensor 34. The specific processing details will be explained later.

In FIG. 4, the speech that is input from microphone 1 is analyzed by speech analysis unit 2, and a speech data pattern matching the characteristics volume of the input speech is created. This speech data pattern is input into the input unit of the neural network provided in speech recognition unit 5, and is recognized as a speech.

Suppose that a phrase "Good morning" issued by a non-specific speaker is input into microphone 1. The characteristics of this speaker's "Good morning" are analyzed by speech analysis unit 2 and are input into speech recognition unit 5 as a speech data pattern.

The speech data pattern of "Good morning" that is input into the neural network of speech recognition unit 5 in this way is output from the output unit of the neural network as a recognition data possessing a value, instead of a binary data. If the recognition data for the phrase "Good morning" is higher than those recognition data for other phrases, speech recognition unit 5 correctly recognizes the speaker's "Good morning" as "Good morning."

The final recognition result for the phrase "Good morning" thus recognized is input into response content creation unit 33. Response content creation unit 33 then determines the response content for the final recognition result, based on the final recognition result and the temperature data from temperature sensor 34.

Therefore, the data content of the response to the recognition data that is output by speech recognition unit 5 can be created according to the current temperature. For example, suppose that the speaker's "Good morning" is correctly recognized by speech recognition unit 5 as "Good morning." Response content creation unit 33 then creates response data "Good morning. It's a bit cold, isn't it?" in reply to the recognition data "Good morning" if the current temperature is low. On the other hand, response data "Good morning. It's a bit hot, isn't it?" is created in reply to the same recognition data "Good morning" if the current temperature is higher. The response data created by response content creation unit 33 is input into speech synthesis unit 6 and drive control unit 7. The speech data input into synthesis unit 6 is converted into speech synthesis data, and is output by speaker 8 embedded in the body of the stuffed toy dog. The recognition data input into drive control unit 7 drives motion mechanism 10 (see FIG. 1) according to the corresponding pre-determined drive condition and moves the mouth of the stuffed toy while the response is being issued.

In this way, the stuffed toy dog can be made to behave as if it sensed a change in the temperature in its environment and responded accordingly. The toy can then be made to act like a living creature by making it respond differently as the surrounding temperature changes even when the same phrase "Good morning" is recognized. Furthermore, the toy is not boring because it responds with different phrases even when the speaker says the same thing.

Working example 5

Next, Working example 5 of the invention will be explained with reference to FIG. 5. Note that stuffed toy dog 30, motion mechanism 10 for moving the mouth of the stuffed toy, etc. shown in FIG. 1 are omitted from FIG. 5. In Working example 5, air pressure is detected as one of the variable data that affect the interaction, and the change in air pressure (good or bad weather) is used for changing the content of the response from response content creation unit 33 shown in Working example 3 above. Air pressure sensor 35 is provided in FIG. 5, and like symbols are used to represent like parts as in FIG. 3. Response content creation unit 33 receives the recognition data from speech recognition unit 5, and determines the response content for the stuffed toy based on the recognition data and the air pressure data from air pressure sensor 35. The specific processing details will be explained later.

In FIG. 5, the speech that is input from microphone 1 is analyzed by speech analysis unit 2, and a speech data pattern matching the characteristics volume of the input speech is created. This speech data pattern is input into the input unit of the neural network provided in speech recognition unit 5, and is recognized as a speech.

Suppose that a phrase "Good morning" issued by a non-specific speaker is input into microphone 1. The characteristics of this speaker's "Good morning" are analyzed by speech analysis unit 2 and are input into speech recognition unit 5 as a speech data pattern.

The speech data pattern of "Good morning" that is input into the neural network of speech recognition unit 5 in this way is output from the output unit of the neural network as a recognition data possessing a value, instead of a binary data. If the recognition data for the phrase "Good morning" is higher than those recognition data for other phrases, speech recognition unit 5 correctly recognizes the speaker's "Good morning" as "Good morning."

The recognition data for the phrase "Good morning" thus recognized is input into response content creation unit 33. Response content creation unit 33 then determines the response content for the input recognition data, based on the input recognition data and the air pressure data from air pressure sensor 35.

Therefore, the data content of the response to the recognition data that is output by speech recognition unit 5 can be created according to the current air pressure. For example, suppose that the speaker's "Good morning" is correctly recognized by speech recognition unit 5 as "Good morning." Response content creation unit 33 then creates response data "Good morning. The weather is going to get worse today." in reply to the recognition data "Good morning" if the air pressure has fallen. On the other hand, response data "Good morning. The weather is going to get better today." is created in reply to the recognition data "Good morning" if the air pressure has risen. The response data created by response content creation unit 33 is input into speech synthesis unit 6 and drive control unit 7. The speech data input into synthesis unit 6 is converted into speech synthesis data, and is output by speaker 8 embedded in the body of the stuffed toy dog. The recognition data input into drive control unit 7 drives motion mechanism 10 (see FIG. 1) according to the corresponding pre-determined drive condition and moves the mouth of the stuffed toy while the response is being issued.

In this way, the stuffed toy dog can be made to behave as if it sensed a change in the air pressure in its environment and responded accordingly. The toy can then be made to act like a living creature by making it respond differently as the air pressure changes even when the same phrase "Good morning" is recognized. Furthermore, the toy is not boring because it responds with different phrases even when the speaker says the same thing.

Working example 6

Figure 6:
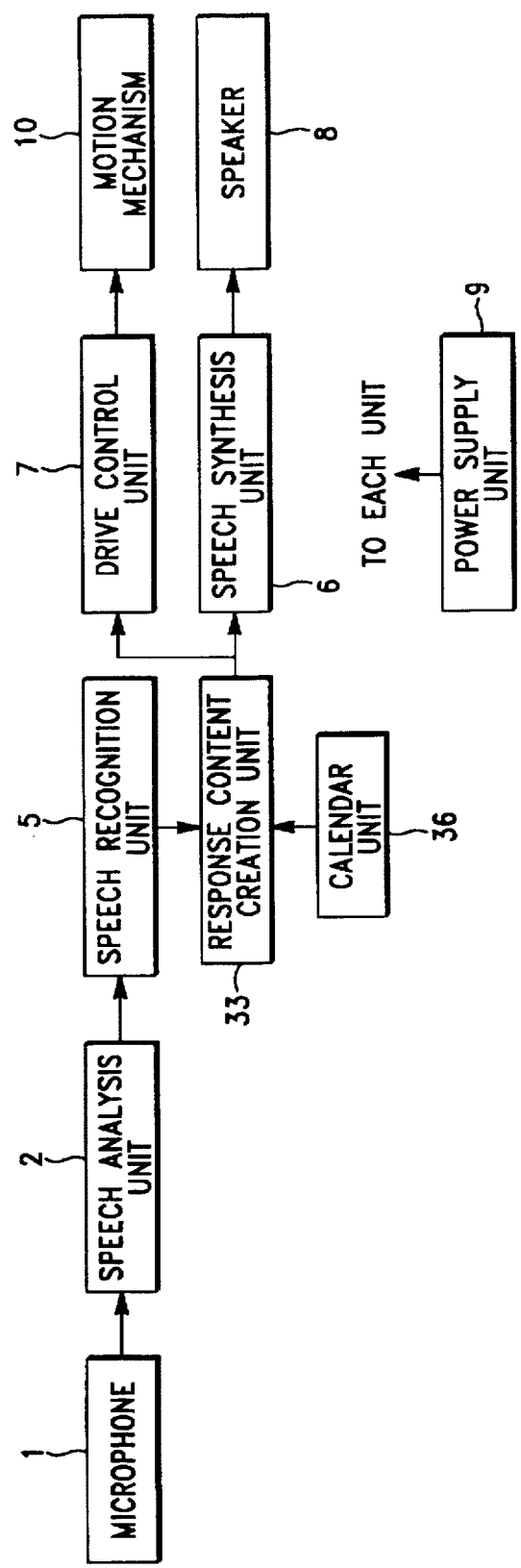
FIG. 6 is a block diagram showing the overall configuration of Working example 6 of the invention.

Next, Working example 6 of the invention will be explained with reference to FIG. 6. Note that stuffed toy dog 30, motion mechanism 10 for moving the mouth of the stuffed toy, etc. shown in FIG. 1 are omitted from FIG. 6. In Working example 6, calendar data is detected as one of the variable data that affect the interaction, and the change in calendar data (change in date) is used for changing the content of the response. The embodiment in FIG. 6 is different from those in FIGS. 4 and 5 in that calendar unit 36 is provided in place of temperature sensor 34 or air pressure sensor 35, and like symbols are used to represent like parts as in FIGS. 4 or 5. Note that calendar unit 36 updates the calendar by referencing the time data from the clock (not shown in the figure). Response content creation unit 33 in Working example 6 receives speech recognition data from speech recognition unit 5, and determines the response content for the stuffed toy based on the recognition data and the calendar data from calendar unit 36. The specific processing details will be explained later.

In FIG. 6, the speech that is input from microphone 1 is analyzed by speech analysis unit 2, and a speech data pattern matching the characteristics volume of the input speech is created. This speech data pattern is input into the input unit of the neural network provided in speech recognition unit 5, and is recognized as a speech.

Suppose that a phrase "Good morning" issued by a non-specific speaker is input into microphone 1. The characteristics of this speaker's "Good morning" are analyzed by speech analysis unit 2 and are input into speech recognition unit 5 as a speech data pattern.

The speech data pattern of "Good morning" that was input into the neural network of speech recognition unit 5 in this way is output from the output unit of the neural network as a recognition data possessing a value, instead of a binary data. If the recognition data for the phrase "Good morning" is higher than those recognition data for other phrases, speech recognition unit 5 correctly recognizes the speaker's "Good morning" as "Good morning."

The recognition data for the phrase "Good morning" thus recognized is input into response content creation unit 33. Response content creation unit 33 then determines the response content for the input recognition data, based on the input recognition data and the calendar data (date information which can also include year data) from calendar unit 36.

Therefore, the data content of the response to the recognition data that is output by speech recognition unit 5 can be created according to the current date. For example, suppose that the speaker's "Good morning" is correctly recognized by speech recognition unit 5 as "Good morning." Response content creation unit 33 then creates response data "Good morning. Please take me to cherry blossom viewing." in reply to the recognition data "Good morning" if the calendar data shows April 1. On the other hand, response data "Good morning. Christmas is coming soon." is created in reply to the same recognition data "Good morning" if the calendar data shows Dec. 23. Naturally, it is possible to create a response that is different from the previous year if the year data is available.

The response data created by response content creation unit 33 is input into speech synthesis unit 6 and drive control unit 7. The speech data input into synthesis unit 6 is converted into speech synthesis data, and is output by speaker 8 embedded in the body of the stuffed toy dog. The recognition data input into drive control unit 7 drives motion mechanism 10 (see FIG. 1) according to the corresponding pre-determined drive condition and moves the mouth of the stuffed toy while the response is being issued.

In this way, the stuffed toy dog can be made to behave as if it sensed a change in the date and responded accordingly. The toy can then be made to act like a living creature by making it respond differently as the date changes even when the same phrase "Good morning" is recognized. Furthermore, the toy is not boring because it responds with different phrases even when the speaker says the same thing.

Although several working examples have been used for explaining the invention, the invention can be widely applied to electronic instruments that are used daily, such as personal digital assistants and interactive games, in addition to toys. Furthermore, in the third and subsequent working examples, speech recognition unit 5 can obtain the final recognition data using weighting coefficients that take into consideration the appropriateness of the content of the speaker's phrase relative to a variable data such as time of day as in Working example 1 or 2, or can obtain the final recognition data using some other method. For example, if the final recognition data is obtained as in Working example 1 or 2 and the response content for this final recognition data is processed as explained in Working examples 3 through 6, the speaker's phrases can be successfully recognized at high rates, and the response to the speaker's phrase can match the prevailing condition much better. Additionally, by using all of the response content processes explained in Working examples 3 through 6 or in some combinations, the response can match the prevailing condition much better. For example, if Working example 2 is combined with Working example 3, and the temperature sensor, the air pressure sensor, and the calendar unit explained in Working examples 4 through 6 are added, accurate speech recognition can be performed that takes into consideration appropriateness of the content of the speaker's phrase relative to time of day, and it is possible to enjoy changes in the level of the response content from the stuffed toy as time passes. Furthermore, interactions that take into account information such as temperature, weather, and date become possible, and thus an extremely sophisticated interactive speech recognition device can be realized.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An interactive speech recognition device, comprising:
   speech analysis means for analyzing an input speech and creating a speech data pattern that matches characteristics of the input speech;
   detection means for detecting variable non-speech data that changes speech flowing from the speech recognition device;
   coefficient setting means, responsive to the variable non-speech data, for generating a plurality of weighting coefficients each pre-assigned to a pre-registered recognition target speech, based on the variable non-speech data;

speech recognition means for computing a final recognition result in response to the speech data pattern, said speech recognition means including:

means for storing a plurality of pre-registered recognition target speeches and for outputting, in response to the speech data pattern, a plurality of recognition data values each for a corresponding pre-registered recognition target speech, means for computing final recognition data by multiplying each recognition data value by a corresponding one of said pre-assigned weighting coefficients for a corresponding pre-registered recognition target speech, and means for recognizing the input speech by comparing the final recognition data for all of the pre-registered recognition target speeches and for outputting a final recognition result; and speech synthesis means for converting the final recognition result to corresponding speech synthesis data for producing an appropriate response to the input speech.

2. The interactive speech recognition device of claim 1, wherein said detection means includes timing means for providing time data, and each of the weighting coefficients generated by said coefficient setting means corresponds to the time data of a day for a corresponding pre-registered recognition target speech.

3. The interactive speech recognition device of claim 2, further comprising coefficient storage means, responsive to the time data from said timing means, for storing past time data relating to past statistic data and for creating weighting coefficients based on the past time data relating to the past statistic data, wherein said coefficient setting means, responsive to said timing means and said coefficient storage means, generates a preset largest value of a weighting coefficient for a pre-selected, pre-registered recognition target speech if the input speech occurs at a peak time at which it was correctly recognized most frequently in the past, and generates a smaller value of the weighting coefficient as time deviates from this peak time.

4. An interactive speech recognition device, comprising:

speech analysis means for analyzing an input speech and creating a speech data pattern that matches characteristics of the input speech;

speech recognition means for generating recognition data that corresponds to the input speech based on the speech data pattern created by said speech analysis means;

timing means for generating time data;

response content level storage means for storing information relating to passage of time relative to a response content level;

response content level generation means for storing time ranges for a plurality of response content levels, said response content level generation means being responsive to the time data from said timing means, the recognition data from said speech recognition means, and the information from said response content level storage means, for generating a response content level value according to passage of time;

response content creation means, responsive to the recognition data from said speech recognition means and the response content level value from said response content level generation means, for determining response content data appropriate for the response content level value generated by said response content level generation means; and speech synthesis means for converting the response content data from said response content creation means to corresponding speech synthesis data for producing an appropriate response to the input speech.

5. An interactive speech recognition device, comprising:

speech analysis means for analyzing an input speech and creating a speech data pattern that matches characteristics of the input speech;

speech recognition means for generating recognition data that corresponds to the input speech, based on the speech data pattern from said speech analysis means;

detection means for detecting variable non-speech data that changes speech flowing from the speech recognition device;

response content creation means, responsive to the variable non-speech data from said detection means and the recognition data from said speech recognition means, for outputting response content data, based on the recognition data by taking the variable non-speech data into consideration, speech synthesis means for converting the response content data to corresponding speech synthesis data for producing an appropriate response to the input speech.

6. The interactive speech recognition device of claim 5, wherein said detection means includes a temperature sensor that measures an environmental temperature and outputs temperature data, and said response content creation means outputs the response content data by taking the temperature data into consideration.

7. The interactive speech recognition device of claim 5, wherein said detection means includes an air pressure sensor that measures an environmental air pressure and outputs air pressure data, and said response content creation means outputs the response content data by taking the air pressure data into consideration.

8. The interactive speech recognition device of claim 5, wherein said detection means includes calendar detection means for detecting calendar data and outputting the calendar data, and said response content creation means outputs the response content data by taking the calendar data into consideration.

9. The interactive speech recognition device of claim 5, wherein said detection means includes timing means for providing time data, and response content data generated by said response content creation means corresponds to the time data of a day for a corresponding pre-registered recognition target speech.

10. An interactive speech recognition device, comprising:

speech analysis means for analyzing an input speech and creating a speech data pattern that matches characteristics of the input speech;

detection means for detecting time data that changes speech flowing from the speech recognition device;

coefficient setting means, responsive to the detected time data, for generating a plurality of weighting coefficients each pre-assigned to a pre-registered recognition target speech, based on the time data;

speech recognition means for computing a final recognition result in response to the speech data pattern, said speech recognition means including:

means for storing a plurality of pre-registered recognition target speeches and for outputting, in response to the speech data pattern, a plurality of recognition data values each for a corresponding pre-registered recognition target speech, means for computing final recognition data by multiplying each recognition data value by a corresponding one of said pre-assigned weighting coefficient for a corresponding pre-registered recognition target speech, and means for recognizing the input speech by comparing the final recognition data for all of the pre-registered recognition target speeches and for outputting a final recognition result; and speech synthesis means for converting the final recognition result to corresponding speech synthesis data for producing an appropriate response to the input speech.

11. An interactive speech recognition device, comprising:

speech analysis means for analyzing an input speech and creating a speech data pattern that matches characteristics of the input speech;

speech recognition means for generating recognition data that corresponds to the input speech, based on the speech data pattern from said speech analysis means;

detection means for detecting variable non-speech data that changes speech flowing from the speech recognition device;

response content creation means, responsive to the variable non-speech data from said detection means and the recognition data from said speech recognition means, for outputting response content data, based on the recognition data by taking the variable data into consideration;

an operating mechanism and a drive control unit responsive to the response content data for controlling the operating mechanism.

12. The interactive speech recognition device of claim 11 further comprising speech synthesis means for converting said response content data to speech synthesis data simultaneous with said drive control unit controlling said operating mechanism in response to said response content data.

* * * * *

UNITED STATES PATENT AND TRADEMARK OFFICE
CERTIFICATE OF CORRECTION

PATENT NO.      : 5,802,488
DATED           : September 01, 1998
INVENTOR(S)     : Isao Edatsune It is certified that errors appear in the above identified patent and that said Letters Patent is hereby corrected as shown below:

Column 19, line 1, change "coefficient" to --coefficients--.

Column 20, line 8, insert --non-speech-- between "variable" and "data".

Signed and Sealed this

Twentieth Day of April, 1999

Attest:

Attesting Officer

Q. TODD DICKINSON

Acting Commissioner of Patents and Trademarks